United States Patent [19]

Ghali

[11] Patent Number: 4,880,848
[45] Date of Patent: Nov. 14, 1989

[54] FOAM, COMPOSITION AND METHOD OF PRODUCTION, CONTAINING POLYURETHANE, POLYISOCYANURATE AND POLYUREA GROUPS

[76] Inventor: Ragui Ghali, 3400-14th Avenue, Markham, Ontario, Canada, L3R 2L6

[21] Appl. No.: 119,923

[22] Filed: Nov. 13, 1987

[30] Foreign Application Priority Data

Nov. 14, 1986 [CA] Canada .................................. 523060

[51] Int. Cl.$^4$ ..................... C08G 18/00; C08G 18/14; C08J 9/00
[52] U.S. Cl. .................................... 521/174; 521/125; 521/128; 521/902; 521/94
[58] Field of Search ................... 521/94, 97, 174, 902, 521/125, 129

[56] References Cited

U.S. PATENT DOCUMENTS

| | | | |
|---|---|---|---|
| 3,922,238 | 11/1975 | Narayan et al. | 521/902 |
| 3,954,684 | 5/1976 | Farrissey, Jr. et al. | 521/902 |
| 3,965,052 | 6/1976 | Iwasaki | 521/902 |
| 3,989,651 | 11/1976 | Lockwood et al. | 521/902 |
| 4,003,859 | 1/1977 | Reymore, Jr. et al. | 521/902 |
| 4,029,610 | 6/1977 | Narayan et al. | 521/902 |
| 4,051,082 | 9/1977 | Lenker et al. | 521/902 |
| 4,256,846 | 3/1981 | Ohashi et al. | 521/902 |
| 4,349,638 | 9/1982 | Narayan | 521/902 |
| 4,710,521 | 12/1987 | Soukup et al. | 521/902 |

*Primary Examiner*—John Kight
*Assistant Examiner*—Dennis R. Daley

*Attorney, Agent, or Firm*—Arne I. Fors; Robert F. Delbridge

[57] ABSTRACT

Ternary polyurethane-polyisocyanurate-polyurea foams having, by weight of the reaction product, 10 to 35 percent polyurethane, 30 to 55 percent isocyanurate and 20 to 45 percent polyurea, and having a lightweight density in the range of 0.5 to 0.9 pounds per cubic foot, overcome the normal fragile nature and friability of polyisocyanurate and polyurea components while rendering the polyurethane component essentially fire resistant. The resultant foam has excellent heat insulating properties, is semi-flexible, extremely light in weight, and can be inexpensively produced by existing two-component foam dispensing equipment.

The process of producing said ternary foam comprises reacting a mixture of 100 parts by weight of an organic polyisocyanate with: 15 to 25 parts by weight of a polyether polyol having a hydroxyl number of about 28 to 35 and a molecular weight of not more than 6000; 5 to 25 parts by weight of water; 0 to 25 parts by weight of a blowing agent; 0 to 50 parts by weight of a filler-plasticizer-fire retardant; an effective amount of a low activation catalyst to initiate water-isocyanate reaction to produce polyurea and polyol-isocyanate reaction to produce polyurethane; and an effective amount of high activation catalyst to retard the low activation catalyst during the formation of polyisocyanurate while concurrently enhancing the formation of polyisocyanurate.

In another embodiment of the process of the invention, water can be replaced by a disubstituted amine for the production of polyurea and by an inert blowing agent for production of cellular foam.

15 Claims, 1 Drawing Sheet

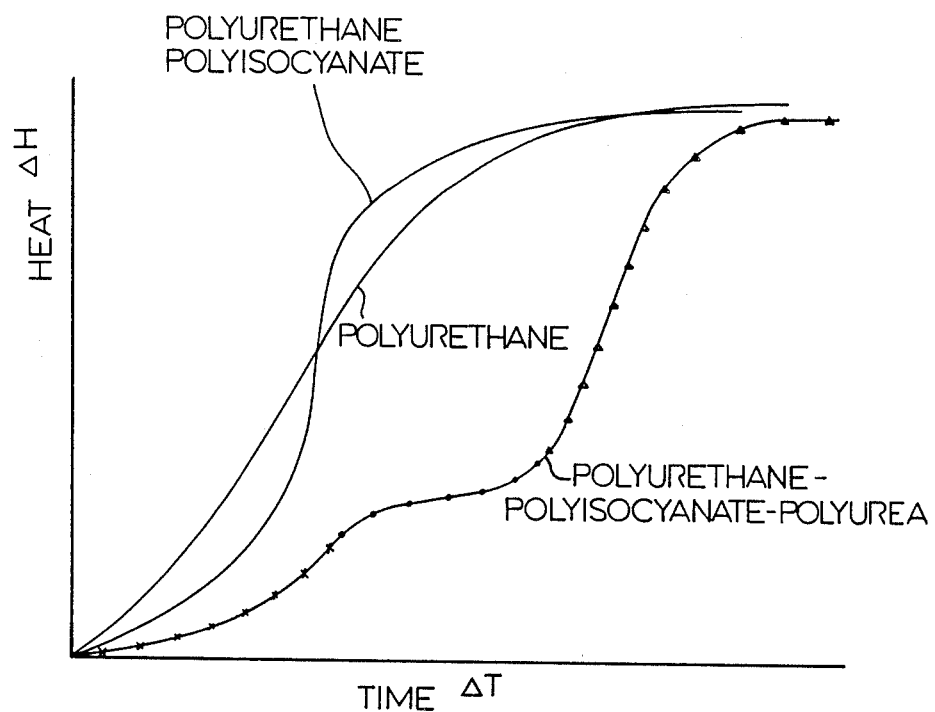

FOAM, COMPOSITION AND METHOD OF PRODUCTION, CONTAINING POLYURETHANE, POLYISOCYANURATE AND POLYUREA GROUPS

BACKGROUND OF THE INVENTION

This invention relates to novel semi-flexible foams that have good heat insulating properties, are flame-retardant and light in weight, and to the process for producing said foam.

Conventional heat-insulating foams are made of polyurethane, polyisocanurate or combinations thereof such as disclosed in U.S. Pat. Nos. 3,931,065 and 4,184,022 in an attempt to produce an inexpensive insulation having high heat insulating properties, stability and fire retardance. However, known products are typically dense and heavy, expensive to produce, friable, have poor fire retardance, or lack stability and have poor resistance to changes in weather conditions.

Polyurethane foams, for example, burn readily when ignited and flame retardant chemicals are normally added in an effort to retard combustion by rendering the foam self-extinguishing, intumescent, or capable of producing a char. U.S. Pat. No. 4,514,524 discloses a polyurethane foam having a halogenated flame retardant and water or alcohol soluble urea-formaldehyde resin added thereto in an attempt to overcome the natural propensity of polyurethane to burn by improving flame retardancy and by adding intumescent properties.

Polyisocyanurate foams can be given high-temperature resistance but they normally remain very brittle and accordingly are subject to damage when handled. Canadian Patent No. 1044847 discloses a typical isocyanurate foam adapted for a high temperature application.

Urea foams have high temperature thermal stability but are very fragile and friable and accordingly generally are considered not suitable as an insulating material.

SUMMARY OF THE INVENTION

It has been found that a ternary foam containing polyurethane, polyisocyanurate and polyurea in predetermined proportions surprisingly overcomes the normal fragile nature and friability of the polyisocyanurate and polyurea components while rendering the polyurethane component essentially fire resistant. The resultant foam has excellent heat insulating properties, is semi-flexible, is extremely light in weight in the range of 0.5 to 0.9 pounds per cubic foot, and can be inexpensively produced by existing two-component foam dispensing equipment.

According to the invention there is provided a ternary polyurethane-polyisocyanurate-polyurea foam having, by weight of the reaction product, 10 to 35 per cent polyurethane, 30 to 55 per cent polyisocyanurate and 20 to 45 per cent polyurea, and having a density in the range of 0.5 to 0.9 pounds per cubic foot.

The said ternary foam is a reaction product of 100 parts by weight of an organic polyisocyanate with: 15 to 25 parts by weight of a polyether polyol having a hydroxyl number of about 28 to 35 and a molecular weight of not more than 6000; 5 to 25 parts by weight of water; 0 to 25 parts by weight of a blowing agent; 0 to 50 parts by weight of a filler-plasticizer fire retardant; an effective amount of a low activation catalyst to initiate water-isocyanate reaction to produce polyurea and polyolisocyanate reaction to produce poly urethane; and an effective amount of a high activation catalyst to retard the low activation catalyst and promote the formation of polyisocyanurate.

The low activity catalyst is present in an amount in the range of about 1.5 to 9 parts by weight per 100 parts by weight of the polyisocyanate, preferably about 6 to 8 parts by weight, and the high activation catalyst is present in an amount in the range of 0.0008 to 0.002 parts by weight per 100 parts by weight of the polyisocyanate, preferably about 0.001 parts by weight.

Water as a reactant and blowing agent can be substituted by an effective amount of a disubstituted amine such as diethanol amine and an inert blowing agent such as fluorcarbon.

BRIEF DESCRIPTION OF THE DRAWING

The accompanying FIGURE is a graph illustrating heat of foam vs. time for a foam produced according to the process of the present invention compared to a conventional polyurethane foam and to a conventional polyurethanepolyisocyanurate foam.

DESCRIPTION OF THE PREFERRED EMBODIMENTS

The process of the present invention can be practised by conventional polyurethane bun or spray systems. Existing urethane dispensing equipment is adapted to process a two-component spray system at a ratio of 1:1 and, since according to the process of the present invention all three of the components of the resulting ternary product compete for polyisocyanate, organic polyisocyanate is one of the two basic reacting components dispensed. The organic polyisocyanate can be selected from conventional polyisocyanates used for foam-forming processes. Polymeric isocyanates are preferred because of cost and availability. An example of a commercially available polymeric isocyanate is produced by Rubicon Ltd.

The other basic component of reaction mixture of the invention for a two-component system dispensing at a 1:1 ratio comprises as basic ingredients polyether polyol, water or disubstituted amine, a blowing agent, low-activation catalyst for controlled production of polyurea and polyurethane, high-activation catalyst for controlled production of poly isocyanate relative to polyurea and polyurethane production, a surfactant, and the balance consisting of a filler-plasticizer-fire retardant.

The polyether polyol ingredient is important for achieving the desired level of 10 to 35 per cent by weight polyurethane in the reaction product. A trifunctional polyether alcohol having an average hydroxyl number of about 28–35 and a molecular weight of not more than about 6000 sufficient to react with 8 to 25 per cent by weight of the polyisocyanate has been found to impart desired semi-flexibility and toughness to the resulting foam. Triol polyether polyol sold under the designation CP 4701(TM) by Dow Chemicals Ltd. has been found satisfactory.

Water is added in an amount of about 5 to 25 per cent by weight of the polyisocyanate to react with and to produce about 20 to 45 per cent by weight polyurea in the reaction product. The quantity of production of polyurea is dependent on the amount of water present and on the rate of reaction of polyisocyanate with water relative to the concurrent rate of reaction of polyisocyanurate formation, which in turn is controlled by heat of reaction and the presence of the high activation catalyst, to be described.

A low activation catalyst such as disubstituted amines, for example tetramethyliminobispropylamine, sold by Abbott Chemicals under the name Polycat 70/15 R, has been found satisfactory for the purpose of initiating water polyisocyanate reactions to produce heat, carbon dioxide and polyurea. The low activation catalyst, in an amount in the range of 1.5 to 9 per cent by weight of the polyisocyanate, preferably 6 to 8 per cent, is effective to cause initiation of polyurea formation by reaction with the water present, and to cause initiation of a reaction between the primary functional groups on the polyol and the polyisocyanate, with the heat evolved from both reactions further catalyzing polyurea and carbon dioxide formations and aiding in cross-linking of the secondary functional groups on the polyol for gellation.

A high activation catalyst such as a metal carboxylic acid, for example, potassium octoate, sold under the name T-45(TM) by M&T Chemicals, present in an amount of about 0.0008 to 0.002 per cent by weight of the polyisocyanate, preferably about 0.001 per cent, enhances the formation of polyisocyanurate. Although it will be understood that I am not bound by hypothetical considerations, it is believed that the presence of an effective amount of the high activation catalyst, e.g. carboxylic acid, inhibits the catalytic reaction of the low activation catalyst, e.g. amine, while concurrently enhancing the formation of polyisocyanurate to permit production of about 30 to 55 per cent by weight of the polyisocyanurate in the reaction product. The reactions proceeding to formation of polyurethane and polyurea are dependent on the effectiveness of the low activation catalyst and the temperature of the exorthermic reaction, the polyurethane reaction requiring a temperature of about 240° F. to proceed and the polyurea reaction requiring a temperature of about 350° F. to produce a stable polyurea product.

The polyisocyanurate reaction proceeds at a relatively low temperature of about 100° F. in the presence of the trimerization catalyst. The presence of the high activation catalyst, until completion of the polyisocyanurate reaction at which time this catalyst becomes inert, inhibits the effectiveness of the low activation catalyst to retard both the polyurethane and polyurea reactions, especially the latter reaction, to maintain the temperature of the reactive mixture in the order of 150°-250° F. This allows the polyisocyanate reaction to proceed to completion, at which time the temperature of the reactive mixture increases to the 350° F. level to allow completion of the polyurethane reaction and formation of the polyurea. An excess of high activation catalyst unduly inhibits the exothermic reactions resulting in undesirable collapse of the expanding foam while a deficiency of said catalyst can result in excessive formation of polyurethane, polyurea and carbon dioxide at the expense of the polyisocyanurate formation.

The FIGURE graphically illustrates the initial formation of polyurethane followed by a plateau during which the polyisocyanurate formation takes place. Rapid polyurea formation then occurs and proceeds to completion concurrent with completion of gellation of polyurethane.

The surface active ingredient can be selected from surfactants conventionally used for the purpose of maintaining nucleation until gellation takes place, and to aid in the control of the rate of reaction. An organosiloxane surfactant such as DC 198(TM), a product of Dow Corning Ltd., in an amount of 0.15 to 0.2 per cent by weight of the polyisocyanate, has been found satisfactory.

The blowing agent ingredient can comprise water alone or water in combination with other conventional blowing agents, such as hydrocarbons or fluorcarbons including FREON 11-B ® by Dupont of Canada. The blowing agent can be present in an amount up to 25 per cent by weight of the polyisocyanate and is believed to serve the dual purpose of reducing viscosity of the resin to facilitate its blending with polyisocyanate and helping maintain the temperature of the exothermic reaction below that at which polyurethane gellation takes place to maintain internal pressure within the rising foam to a minimum.

The plasticizer, such as dioctophthalate or tricresylpropylphthalate, is conventionally used for such purpose, and is mixed with known fillers and fire retardants.

According to another embodiment of the process of the invention, a substituted amine can replace the function of water in the production of the urea constituent of the ternary light-weight foam structure. In the absence of water as a blowing agent, an inert blowing agent such as hydrocarbons, fluorcarbons, nitrogens and the like commonly used in the industry can be used as a water substitute. FREON 11-B ® is satisfactory for this purpose.

Suitable disubstituted amines can be selected from diethanol amines, diproponal amines, dibutanol amines and the like and their equivalence of multiple alcohols.

The following examples describe various reaction mixtures of the invention. It is intended that the specification and examples are exemplary only of the invention, the scope and purview of the invention being indicated by the appended claims.

EXAMPLES 1-4

These examples typify batch preparations of reactive mixtures for production of a foam by a "one shot" method using the same two component spray system dispensing at a ratio of 1:1 for all foams.

The "A" component, ie. polymeric isocyanate, was added to a mixture of the other ingredients in the formulation. The polymeric isocyanate is expressed as 100 parts by weight and the other constituents of the "B" component in all examples are accordingly expressed as parts by weight relative to 100 parts of the "A" component. The ingredients used and their respective quantities are set out in Table 1.

TABLE 1

| INGREDIENT | EXAMPLES (Parts by Weight) | | | |
|---|---|---|---|---|
| | 1 | 2 | 3 | 4 |
| COMPONENT "B" | | | | |
| Triol polyether polyol-sold by Dow Chemical Ltd. as "cp4701" | 20 | 20 | 20 | 20 |
| High activation catalyst-sold by M & T Chemicals as "T-45" | 0.008 | 0.001 | 0.001 | 0.001 |
| Organosiloxane surfactant sold by Dow Corning Ltd. as "DC198" | 0.18 | 0.12 | 0.12 | 0.12 |
| Low activation catalyst-sold by Abbott Chemicals as "POLYCAT 70/15" | 1.8 | 8.3 | 5.9 | 5.9 |
| Water | 6 | 19.7 | 19.7 | — |
| Blowing agent-FREON 11-B | 21 | — | 21 | 21 |

TABLE 1-continued

| INGREDIENT | EXAMPLES (Parts by Weight) | | | |
|---|---|---|---|---|
| | 1 | 2 | 3 | 4 |
| Filler/plasticizer/fire retardants | 51 | 46.2 | 33.4 | 45.6 |
| Disubstituted amine (diethandamine) | — | — | — | 7.5 |
| Component "A" | | | | |
| Polymeric isocyanate-sold by MDI by Rubicon Ltd. | 100 | 100 | 100 | 100 |
| PRODUCT | | | | |
| Density (lbs./cubic foot) | 0.85 | 0.85 | 0.57 | 0.70 |

The densities of the products produced by each example were in the range of 0.5 to 0.9.

I claim:

1. In a process for preparing a semi-flexible, light-weight fire-retardant foam having a density in the range of 0.5 to 0.9 pounds per cubic foot by the reaction of polyether polyol and an organic polyisocyanate in the presence of water or disubstituted amine, a surfactant and a blowing agent, the improvement comprising adding to the foaming reactants an effective amount of catalysts for inhibiting polyurethane and polyurea formation while enhancing polyisocyanurate formation until completion of said polyisocyanurate formation to produce a ternary foam in which the reactant groups are present in the percentage of 10 to 35 per cent polyurethane, 30 to 35 per cent polyisocyanurate and to 20 to 45 per cent polyurea.

2. In the process as claimed in claim 1, said polyether polyol having a hydroxyl number of about 28 to 35 and a molecular weight of not more than 6000.

3. In the process claimed in claim 2, said polyether polyol being present in an amount of 15 to 25 parts by weight per 100 parts by weight of polyisocyanate, said water being present in an amount of 5 to 25 parts per weight per 100 parts by weight of polyisocyanate, and said blowing agent being present in an amount up to 25 parts by weight per 100 parts by weight of polyisocyanate.

4. In the process of claim 2, said polyether polyol being present in an amount of 15 to 25 parts by weight per 100 parts by weight of polyisocyanate, said disubstituted amine being present in an amount of 5 to 10 parts by weight per 100 parts by weight of polyisocyanate, and said blowing agent being present in an amount of 10 to 25 parts by weight per 100 parts by weight of polyisocyanate.

5. In the process as claimed in claim 3, the catalysts comprising a low activation catalyst for polyurea production and a high activation catalyst for polyisocyanurate production, said low activation catalyst while initiating the reaction of water or disubstituted amine and polyisocyanate to product polyurea being inhibited by the high activation catalyst until completion of polyisocyanurate formation.

6. In the process as claimed in claim 4, the catalysts comprising a low activation catalyst for polyurea production and a high activation catalyst for polyisocyanurate production, said low activation catalyst while initiating the reaction of water or disubstituted amine and polyisocyanate to produce polyurea being inhibited by the high activation catalyst until completion of polyisocyanurate formation.

7. In the process as claimed in claim 5, said high activation catalyst being carboxylic acid added in an amount of 0.008 to 0.002 parts by weight per 100 parts of the polyisocyanate and said low activation catalyst being a disubstituted amine added in an amount of 1.5 to 9 parts by weight per 100 parts of the polyisocyanate.

8. In the process as claimed in claim 6, said high activation catalyst being carboxylic acid added in an amount of 0.0008 to 0.002 parts by weight per 100 parts of the polyisocyanate and said low activation catalyst being a disubstituted amine added in an amount of 1.5 to 9 parts by weight per 100 parts of the polyisocyanate.

9. In the process as claimed in claim 5, said high activation catalyst being carboxylic acid added in the amount of 6 to 8 parts by weight per 100 parts by weight of the polyisocyanate and said low activation catalyst being a disubstituted amine added in the amount of 0.001 parts by weight per 100 parts by weight of polyisocyanate.

10. In the process as claimed in claim 6, said high activation catalyst being carboxylic acid added in the amount of 6 to 8 parts by weight per 100 parts by weight of the polyisocyanate and said low activation catalyst being a disubstituted amine added in the amount of 0.001 parts by weight per 100 parts by weight of polyisocyanate.

11. A ternary polyurethane-polyisocyanurate-urea foam in which the reactant groups are present in the percentage of 10 to 35 per cent polyurethane, 30 to 55 per cent polyisocyanurate and 20 to 45 per cent polyurea, and having a density in the range of 0.5 to 0.9 pounds per cubic foot.

12. A semi-flexible, light-weight, fire-resistant foam having a density in the range of 0.5 to 0.9 pounds per cubic foot in which the reactant groups are present in the percentage of 10 to 35 per cent polyurethane, 30 to 35 per cent polyisocyanurate and to 20 to 45 per cent polyurea which is the reaction product of 100 parts by weight of an organic polyisocyanate with: 15 to 25 parts by weight of a polyether polyol having a hydroxyl number of about 28 to 35 and a molecular weight of not more than 6000; 5 to 25 parts by weight of water or equivalent or disubstituted amine; 0 to 25 parts by weight of a blowing agent; 0 to 50 parts by weight of a filler-plasticizer fire retardant; an effective amount of a low activation catalyst to initiate water-isocyanate reaction to produce urea; and an effective amount of a high activation catalyst to retard the low activation catalyst during the formation of polyisocyanurate.

13. A foam according to claim 12 in which the low activity catalyst is a disubstituted amine in the amount of 1.5 to 9 parts by weight per 100 parts by weight of polyisocyanate and the high activity catalyst is carboxylic acid in the amount of 0.0008 to 0.002 parts by weight per 100 parts by weight of polyisocyanate.

14. A novel composition for mixing and reacting with 100 parts by weight of an organic polyisocyanate to form a semi-flexible, light-weight fire-retardant foam having a density in the range of 0.5 to 0.9 pounds per cubic foot in which the reactant groups are present in the percentage of 10 to 35 per cent polyurethane, 30 to 35 per cent polyisocyanurate and to 20 to 45 per cent polyurea comprising 15 to 25 parts by weight of a polyether polyol having a hydroxyl number of about 28 to 35 and a molecular weight of not more than 6000; 5 to 25 parts by weight of water or the functional equivalent of disubstituted amine for production of polyurea; 0 to 25 parts by weight of a blowing agent; 0 to 50 parts by weight of a filler-plasticizer-fire-retardant; 1.5 to 9 parts by weight of a low activity disubstituted amine catalyst and 0.0008 to 0.002 parts by weight of a high activity carboxylic acid catalyst.

15. A composition as claimed in claim 14 in which said low activity catalyst is present in an amount of 6 to 8 parts by weight and said high activity catalyst is present in the amount of 0.001 part by weight.

* * * * *